United States Patent [19]
Furukawa et al.

[11] Patent Number: 5,579,350
[45] Date of Patent: Nov. 26, 1996

[54] CLOCK CHANGE CIRCUIT PREVENTING SPIKE GENERATION BY DELAYING SELECTION CONTROL SIGNAL

[75] Inventors: Yukio Furukawa; Akihiko Takada; Kazuo Wani, all of Kawasaki, Japan

[73] Assignee: Fujitsu Limited, Kanagawa, Japan

[21] Appl. No.: 393,947

[22] Filed: Feb. 22, 1995

Related U.S. Application Data

[63] Continuation of Ser. No. 34,498, Mar. 19, 1993, abandoned.

[30] Foreign Application Priority Data

Mar. 19, 1992 [JP] Japan ................................. 4-063993

[51] Int. Cl.⁶ ........................................................ H04L 7/00
[52] U.S. Cl. ........................... 375/371; 375/359; 327/99; 327/153; 327/161; 326/93; 370/105.3
[58] Field of Search ........................... 375/356, 362, 375/371–373, 376, 354, 357; 327/141, 142, 144, 145, 146, 147, 149, 150, 152, 153, 161, 162, 163, 99; 326/96, 93; 395/550; 331/49

[56] References Cited

U.S. PATENT DOCUMENTS

| | | | |
|---|---|---|---|
| 4,398,155 | 8/1983 | Atwell, Jr. et al. | 328/73 |
| 4,853,653 | 8/1989 | Maher | 331/49 |
| 4,855,615 | 8/1989 | Humpleman | 327/144 |
| 4,870,299 | 9/1989 | Chen | 327/99 |
| 4,965,524 | 10/1990 | Patchen | 328/72 |
| 4,970,405 | 11/1990 | Hagiwara | 327/145 |
| 5,015,871 | 5/1991 | Sirabella | 327/144 |
| 5,155,380 | 10/1992 | Hwang et al. | 327/99 |
| 5,197,126 | 3/1993 | Harrell | 395/550 |
| 5,247,656 | 9/1993 | Kabuo et al. | 395/550 |
| 5,274,678 | 12/1993 | Ferolito et al. | 375/357 |
| 5,289,050 | 2/1994 | Ogasawara | 327/141 |
| 5,291,528 | 3/1994 | Vermeer | 375/354 |
| 5,378,934 | 1/1995 | Takahashi et al. | 327/203 |
| 5,381,542 | 1/1995 | Carlson | 395/550 |

FOREIGN PATENT DOCUMENTS

| | | |
|---|---|---|
| 2183621 | 7/1990 | Japan . |
| 3126114 | 5/1991 | Japan . |

*Primary Examiner*—Young T. Tse
*Assistant Examiner*—William Luther

[57] ABSTRACT

A clock change circuit contains: a clock gate unit for receiving first and second clock signals, and detecting a timing at which both the first and second clock signals are at an inactive level to output an active timing signal indicating the timing; a delay unit for inputting a select control signal and the timing signal, and outputting a delayed select control signal the state of which is changed to the same state of the select control signal after the active timing signal is received from the clock gate unit; and a select unit for inputting the first and second clock signals, and selects one of the first and second clock signals according to the delayed select signal to output the selected clock signal.

4 Claims, 12 Drawing Sheets

Fig. 7A PRIOR ART — CLOCK SIGNAL A
Fig. 7B PRIOR ART — CLOCK SIGNAL B
Fig. 7C PRIOR ART — CHANGE SIGNAL CHNG
Fig. 7D PRIOR ART — SELECT CONTROL SIGNAL SEL
Fig. 7E PRIOR ART — OUTPUT CLOCK SIGNAL OUT

Fig. 8

Fig. 10A  CLOCK SIGNAL A

Fig. 10B  CLOCK SIGNAL B

Fig. 10C  CHANGE SIGNAL CHNG (SEL 3)

Fig. 10D  CLOCK SUPPLIED TO FF 12

Fig. 10E  SELECT CONTROL SIGNAL SEL

Fig. 10F  OUTPUT CLOCK SIGNAL OUT

Fig. 11

Fig. 12A TRANSMISSION FRAME PHASE TF

Fig. 12B TRANSMISSION FRAME (NT → TE)

Fig. 12C TRANSMISSION CLOCK

Fig. 12D RECEPTION FRAME FROM TERMINAL a

Fig. 12E RECEPTION FRAME FROM TERMINAL b

Fig. 12F SYNTHESIZED SIGNAL TE → NT

Fig. 12G RECEPTION FRAME PHASE RF (BEFORE DISCONNECTION OF NEAREST TE)

Fig. 12H RECEPTION FRAME PHASE RF (AFTER DISCONNECTION OF NEAREST TE)

Fig. 12I ADAPTIVE CLOCK ADP

Fig. 12J FIXED CLOCK FIX

CLOCK CHANGE CIRCUIT PREVENTING SPIKE GENERATION BY DELAYING SELECTION CONTROL SIGNAL

This is a continuation of application Ser. No. 08/034,498, filed Mar. 19, 1993, now abandoned.

BACKGROUND OF THE INVENTION

1. Field of the Invention

The present invention relates to a clock change circuit receiving two clock signals, and selecting one of the clock signals for use.

The present invention relates, in particular, to a clock change circuit receiving two clock signals, and selecting one of the two clock signals for use, where the duty ratios of the two clock signals are equal, and the phase of one of the two clock signals selected after a clock change is delayed by a phase difference not less than 0° and less than a duration in which each of the clock signals is at an active level in a cycle, from the phase of the other of the two clock signals selected before the clock change.

The present invention is applicable, in particular, to a clock change circuit provided in a master apparatus (network termination apparatus) to which a plurality of terminals are bus-connected according to the CCITT recommendation I.430. In such a clock change circuit, an operation of changing a receiving clock is performed from a clock signal extracted (regenerated) from data received from a terminal nearest the master apparatus to a fixed clock signal generated in the master apparatus. Data transmitted from the terminals are received in synchronization with the receiving clock.

2. Description of the Related Art

In the above construction of the CCITT recommendation I.430, one of the terminals may continuously supply data to the master apparatus when the receiving clock signal is changed from one to the other. The data is required to be received continuously by the master apparatus without a trouble when the receiving clock signal is changed from one to the other.

The CCITT recommendation I.430 provides recommendations for constructing a system comprising a network termination apparatus to which one or plurality of terminals are connected through a two-way transmission line (bus), and in the system the network termination apparatus can simultaneously receive signals output from two terminals, where the signals output from two terminals are synthesized on the same bus to generate a synthesized signal, and the network termination apparatus receives the synthesized signal and recognizes the respective signals contained in the synthesized signal. In the system according to the CCITT recommendation I.430, although generally more than two terminals can be connected to the two-way transmission line (bus) which is connected to the network termination apparatus, at most two terminals among the more than two terminals simultaneously output signals to the network termination apparatus.

In the system according to the CCITT recommendation I.430, the receiving clock of the network termination apparatus is obtained from a phase-locked loop (PLL) circuit which extracts a clock signal synchronized with the rise time of a frame synchronization bit contained in a frame received from a terminal nearest the network termination apparatus so that the receiving clock synchronizes with data received from the terminal nearest the network termination apparatus, of the two terminals simultaneously transmitting signals to the network termination apparatus. Further, in the network termination apparatus according to the CCITT recommendation I.430, when the network termination apparatus detects that a delay in a phase of a clock signal extracted from a signal received from the nearest terminal is less than a predetermined value (that is, a distance from the network termination apparatus to the nearest terminal is very small), the receiving clock is changed from the above clock signal synchronized with the signal received from the nearest terminal, to a fixed clock generated in the network termination apparatus. Inversely, when the network termination apparatus detects that a delay in a phase of a clock signal extracted from a signal received from the nearest terminal nearest terminal is not less than the predetermined value (that is, a distance from the network termination apparatus to the nearest terminal is not very small), the receiving clock is changed from a fixed clock generated in the network termination apparatus, to the above clock signal synchronized with the signal received from the nearest terminal.

Therefore, in the first case wherein one of two terminals simultaneously transmitting signals to the network termination apparatus, stops the transmission of the signal, and the terminal which stops the transmission is located nearest the network termination apparatus; or in the case wherein a first terminal of first and second terminals simultaneously transmitting signals to the network termination apparatus stops the transmission of the signal, then a third terminal other than the above first and second terminals begins transmission of a signal, and the first or third terminal is located nearest the network termination apparatus, the nearest terminal is changed, and the above change of the receiving clock between the fixed clock generated in the network termination apparatus, and the above clock signal synchronized with the signal received from the nearest terminal, may be performed dependent upon the distance from the network termination apparatus to the nearest terminal.

Figure 1:
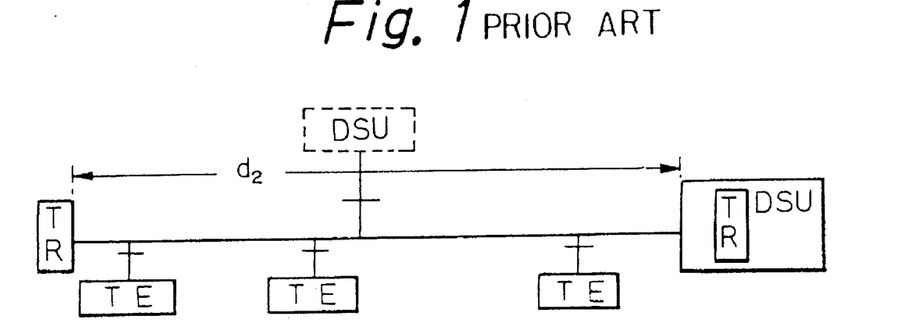
FIG. 1 is a diagram illustrating the first bus connection configuration according to the CCITT recommendation I.430.
Figure 2:
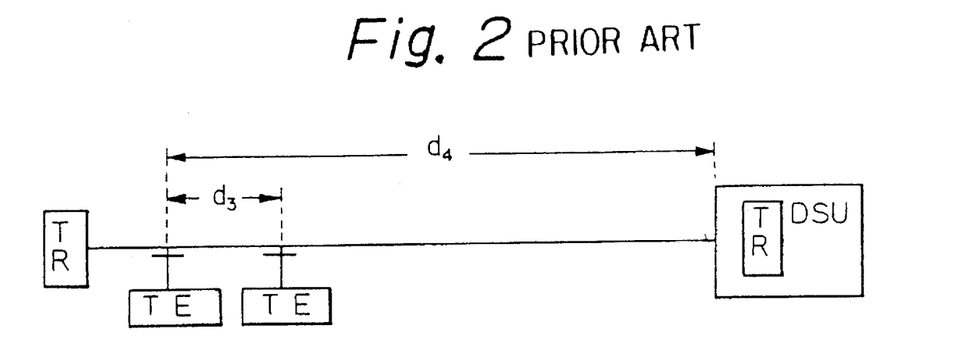
FIG. 2 is a diagram illustrating the second bus connection configuration according to the CCITT recommendation I.430.
Figure 3:
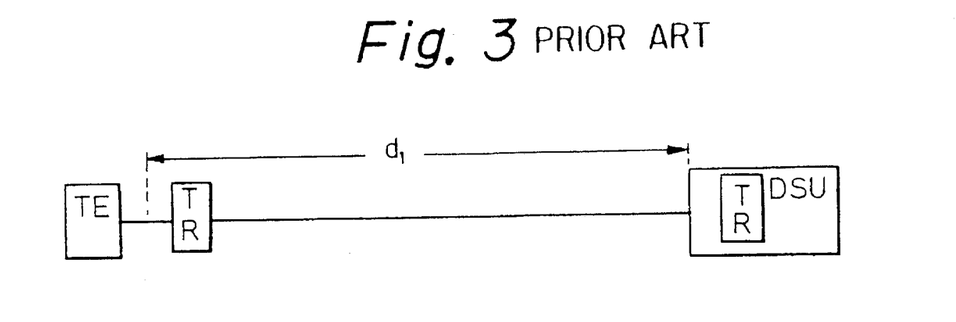
FIG. 3 is a diagram illustrating the third bus connection configuration according to the CCITT recommendation I.430.

The CCITT recommendation I.430 recommends three types of configurations as indicated in FIGS. 1, 2, and 3. In FIGS. 1, 2, and 3, DSU denotes a digital service unit (network termination apparatus), TE denotes a terminal, and TR denotes a termination resistance. The configuration of FIG. 1 is called a short distance passive bus connection. In the short distance passive bus connection configuration, the distance d2 from the digital service unit DSU to the termination resistance TR is 100 to 200 meters, the terminal TE is allowed to be connected to an arbitrary position between the digital service unit DSU to the termination resistance TR. The configuration of FIG. 2 is called an extended passive bus connection. In the extended passive bus connection configuration, a line extension, i.e., a distance d4 from the digital service unit DSU to the farthest terminal TE is at least 500 meters, the distance d3 between two terminals TE simultaneously transmitting signals to the digital service unit DSU is limited within a range of 25 to 50 meters. The configuration of FIG. 3 is called a point-to-point connection. In the point-to-point connection configuration, only one terminal TE transmits a signal to the digital service unit DSU. The digital service unit DSU is connected to an end of the transmission line, and the terminal TE is connected to the other end of the transmission line. The distance d1 from the digital service unit DSU to the terminal TE is, for example, 1 kilometers.

Generally, when more than two terminals are connected to the two-way transmission line (bus) which is connected to the digital service unit DSU (network termination apparatus), the configuration may be changed from one to another of the three configurations of FIGS. 1, 2, and 3, according to change of the two terminals TE which transmit signals to the digital service unit DSU (network termination apparatus).

In the case considered here, one of the two terminals transmitting signals to the digital service unit DSU is changed to another terminal while the other of the two terminals continuously transmitting signals carrying information which must be transmitted to the digital service unit DSU without intermission. In this case, the receiving clock must be changed without trouble when the change is required according to the change of the terminal which transmits a signal, so that the above information which must be transmitted to the digital service unit DSU without intermission, can be received by the digital service unit DSU without trouble.

According to the above configurations of FIGS. 1, 2, and 3, a relative delay between the signals transmitted from the two terminals TE, is estimated to be at most 2 microseconds when the period of one bit is 5.2 microseconds, that is, at most about 40% of a period. As explained later, a condition is assumed that in the change of the receiving clock between the fixed clock generated in the network termination apparatus, and the above clock signal synchronized with the signal received from the nearest terminal, the phase of the fixed clock signal is preset so that the phase of the clock signal before the change is in advance to the phase of the clock signal after the change, when duty ratios of the above clock signals before and after the change are 50%. Such a setting of the phase of the fixed clock signal is possible by appropriately setting a delay in the fixed clock signal with regard to a transmitting clock signal in the digital service unit DSU.

Thus, the requirement for the clock change circuit used in the digital service unit DSU of the CCITT recommendation I.430, is to assure that the information which must be transmitted to the digital service unit DSU without intermission, can be received by the digital service unit DSU when the receiving clock is changed to one to the other of two clock signals when the duty ratios of the two clock signals are 50%, and the phase of one of the two clock signals selected after a clock change is delayed from the phase of the other of the two clock signals selected before the clock change by a phase difference pd in a range $0° \leq pd < 180°$.

In addition, the clock change circuit satisfying the above requirement can be used in applications other than the digital service unit DSU according to the CCITT recommendation I.430.

Further, generally, the clock change circuit satisfies requirements that a receiving clock can be changed from one to the other of two clock signals without trouble when the duty ratios of the two clocks are equal, and the phase of one of the two clock signals selected after a clock change is delayed by a phase difference not less than 0° and less than a duration in which each of the clock signals is at an active level in a cycle, from the phase of the other of the two clock signals selected before the clock change.

Figure 4:
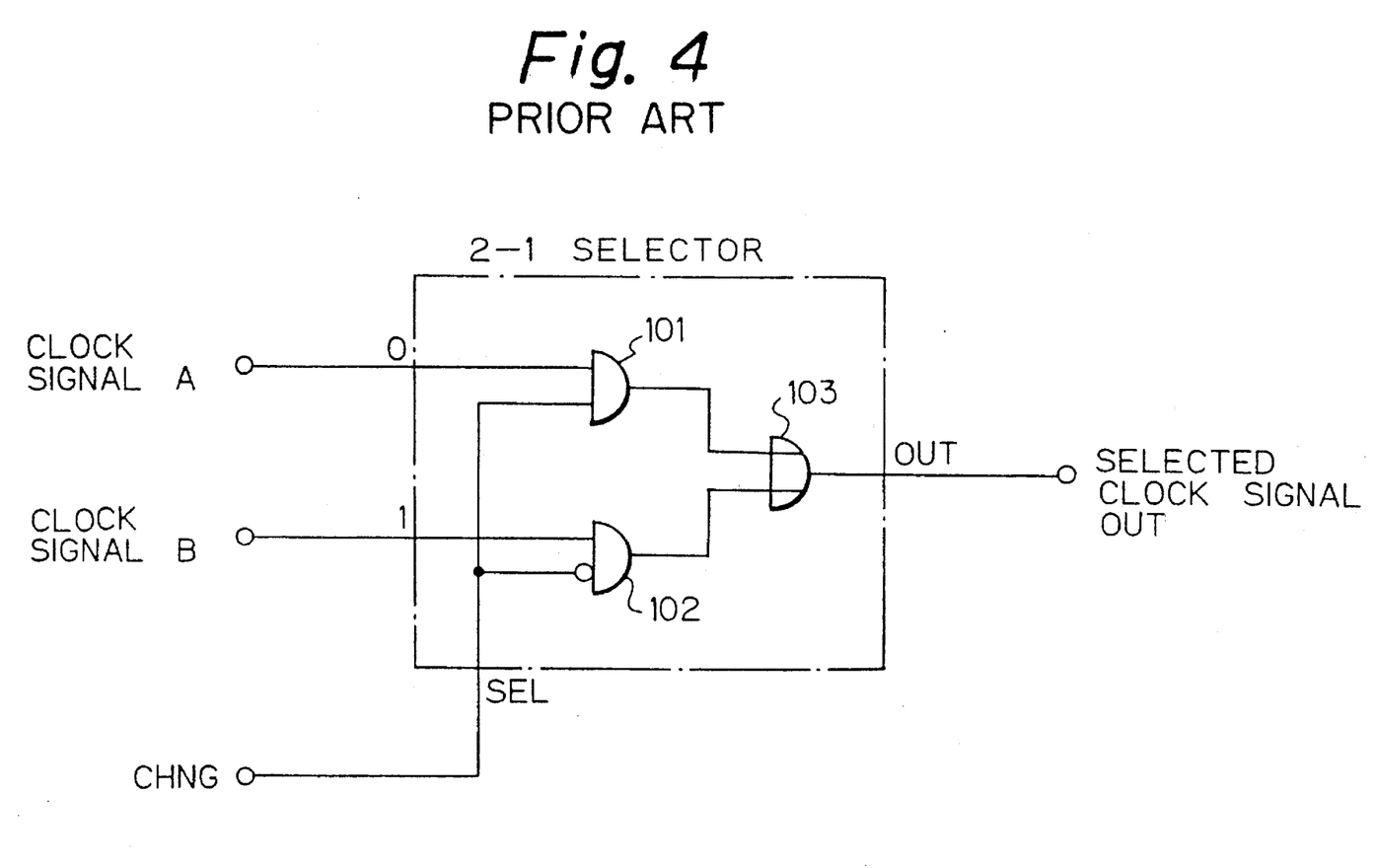
FIG. 4 is a diagram illustrating a conventional clock change circuit.
Figure 5A:
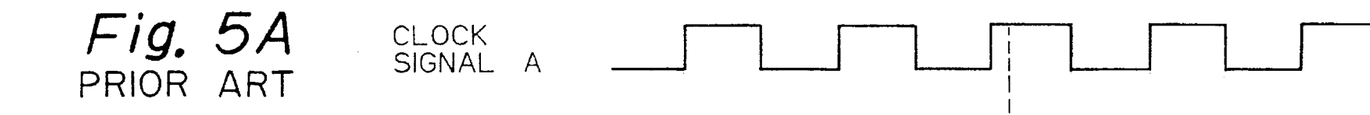
FIGS. 5A to 5D are timing diagrams of the operation of the construction of FIG. 4.
Figure 5B:
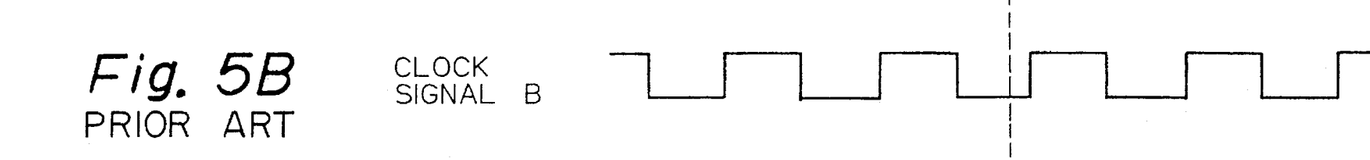
Figure 5C:
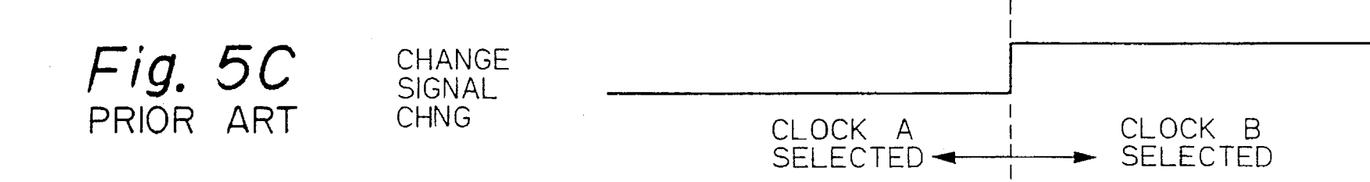
Figure 5D:
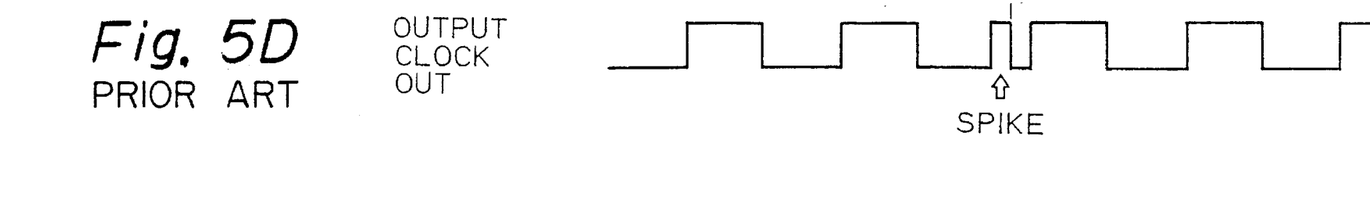

FIG. 4 is a diagram illustrating a conventional clock change circuit. The construction of FIG. 4 is comprised of a 2–1 selector which simultaneously receives two clock signals A and B at two input terminals thereof, and selects one of the received signals according to a change control signal CHNG received at a control input terminal SEL thereof, to output the selected signal.

FIGS. 5A to 5D are timing diagrams of an operation of the construction of FIG. 4 when the phase of the clock signal B which is selected after the change is delayed by a phase difference in a range not less than 0° and less than 180°, from the phase of the clock signal A which is selected before the clock change. As indicated in FIGS. 5A to 5D, a spike as shown may appear in the output of the construction of FIG. 4 when the clock signal is changed. When such a spike appears in the receiving clock a problem such as reading the same data twice, may occur.

Figure 6:
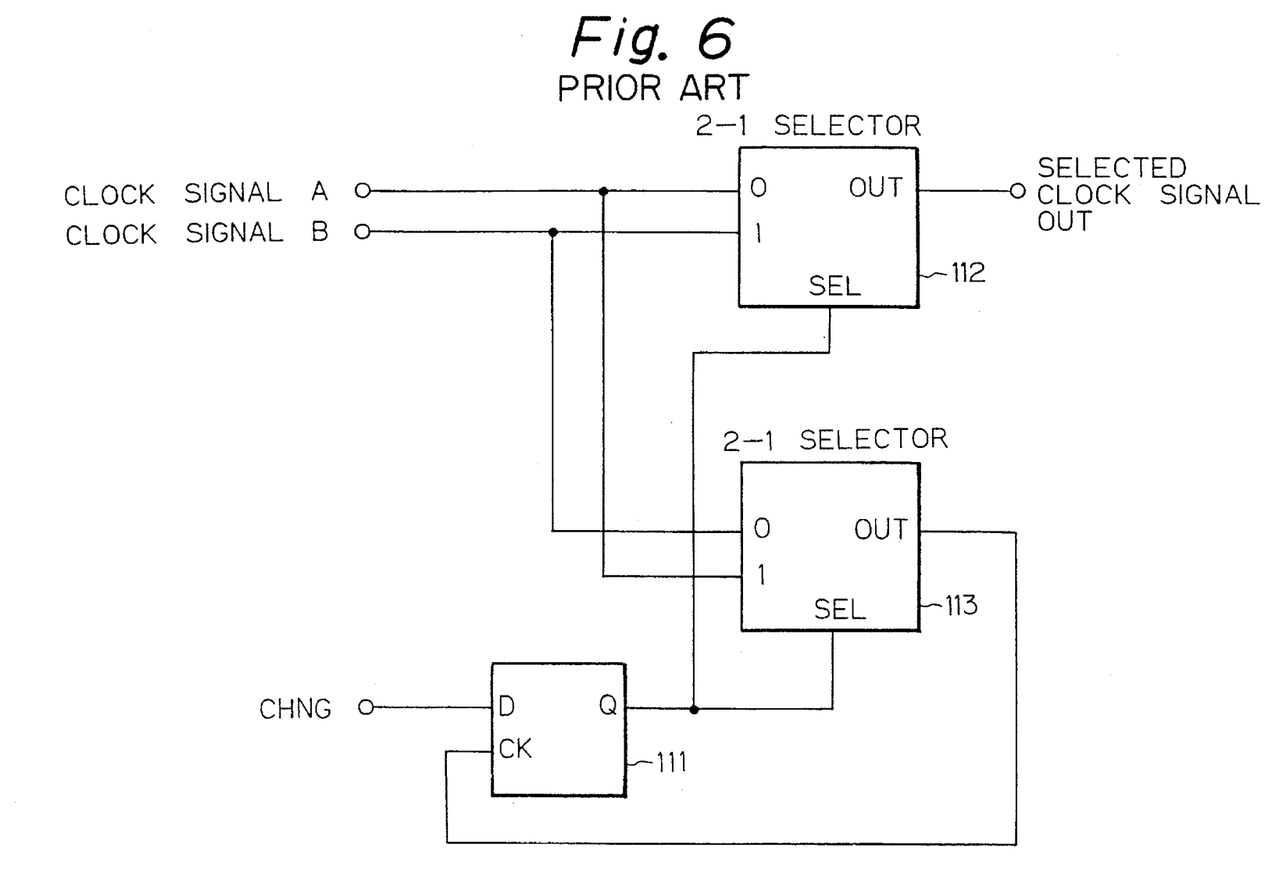
FIG. 6 is a diagram illustrating another conventional clock change circuit.
Figure 7A:
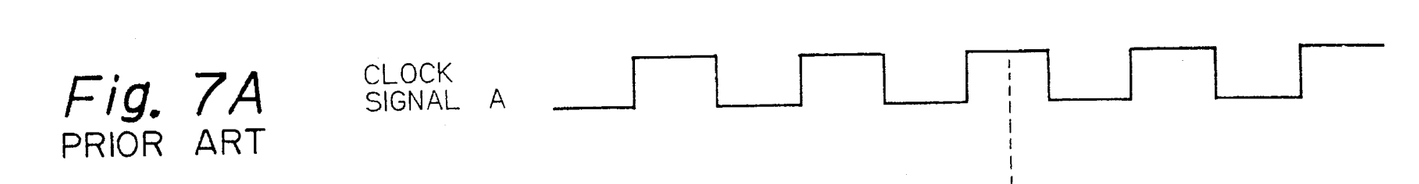
FIGS. 7A to 7E are timing diagrams of the operation of the construction of FIG. 6.
Figure 7B:
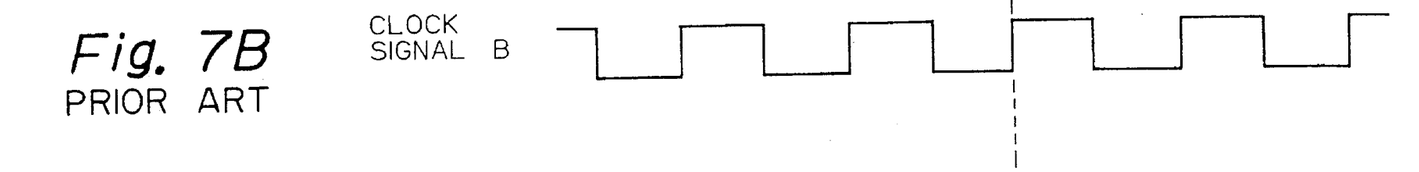
Figure 7C:
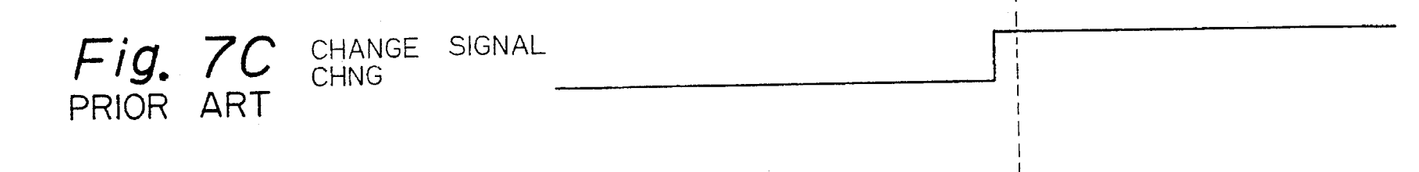
Figures 7D, 7E:
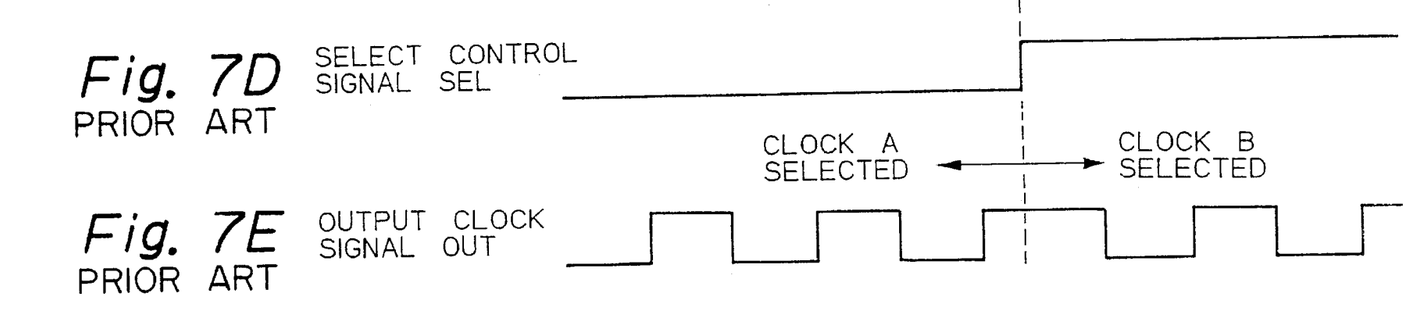

FIG. 6 is a diagram illustrating another conventional clock change circuit, which is provided for avoiding the generation of a spike in the output of the construction of FIG. 4.

In the construction of FIG. 6, reference numeral 111 denotes a D-type flip-flop circuit, 112 and 113 each denote a 2–1 selector. Both the clock signals A and B, which are respectively selected before and after the clock change, are applied to two input terminals of each of the two 2–1 selectors 112 and 113. A change signal CHNG, which is supplied to the construction of FIG. 6 from outside to instruct the clock change, is applied to the data input terminal D of the D-type flip-flop circuit 111. The output of the 2–1 selector 113 is applied to the clock input terminal (edge-triggered input terminal) CK of the D-type flip-flop circuit 111, and the Q output of the D-type flip-flop circuit 111 is applied to control input terminals of the two 2–1 selectors 112 and 113 as a select control input signal.

FIGS. 7A to 7E are timing diagrams of an operation of the construction of FIG. 6 when the phase of the clock signal B which is selected after the change is delayed by a phase difference in a range not less than 0° and less than 180°, from the phase of the clock signal A which is selected before the clock change. As indicated in FIGS. 7A to 7E, no spike appears in the output of the construction of FIG. 6.

However, in the above construction of FIG. 6, the hardware size is increased due to the use of two 2–1 selectors.

SUMMARY OF THE INVENTION

An object of the present invention is to provide a clock change circuit receiving two clock signals, and selecting one of two clock signals for use when the duty ratios of the first and second clocks are equal, the phase of the second clock is delayed by a phase difference not less than 0° and less than a duration in which each of the clock signals is at an active level in a cycle, and provision is given for preventing trouble in the use of the selected clock signal when changing from one to another of the two received clock signals, and reducing the hardware size.

According to the present invention, there is provided A clock change circuit comprising: a clock gate unit for receiving first and second clock signals, and detecting the time at which both the first and second clock signals are at an inactive level to output an active timing signal indicating the timing; a delay unit for inputting a select control signal and the timing signal, and outputting a delayed select control signal the state of which is changed to the same state of the select control signal after the active timing signal is received from the clock gate unit; and a select unit for inputting the first and second clock signals, and selects one of the first and second clock signals according to the delayed select signal to output the selected clock signal.

DESCRIPTION OF THE PREFERRED EMBODIMENTS

Figure 8:
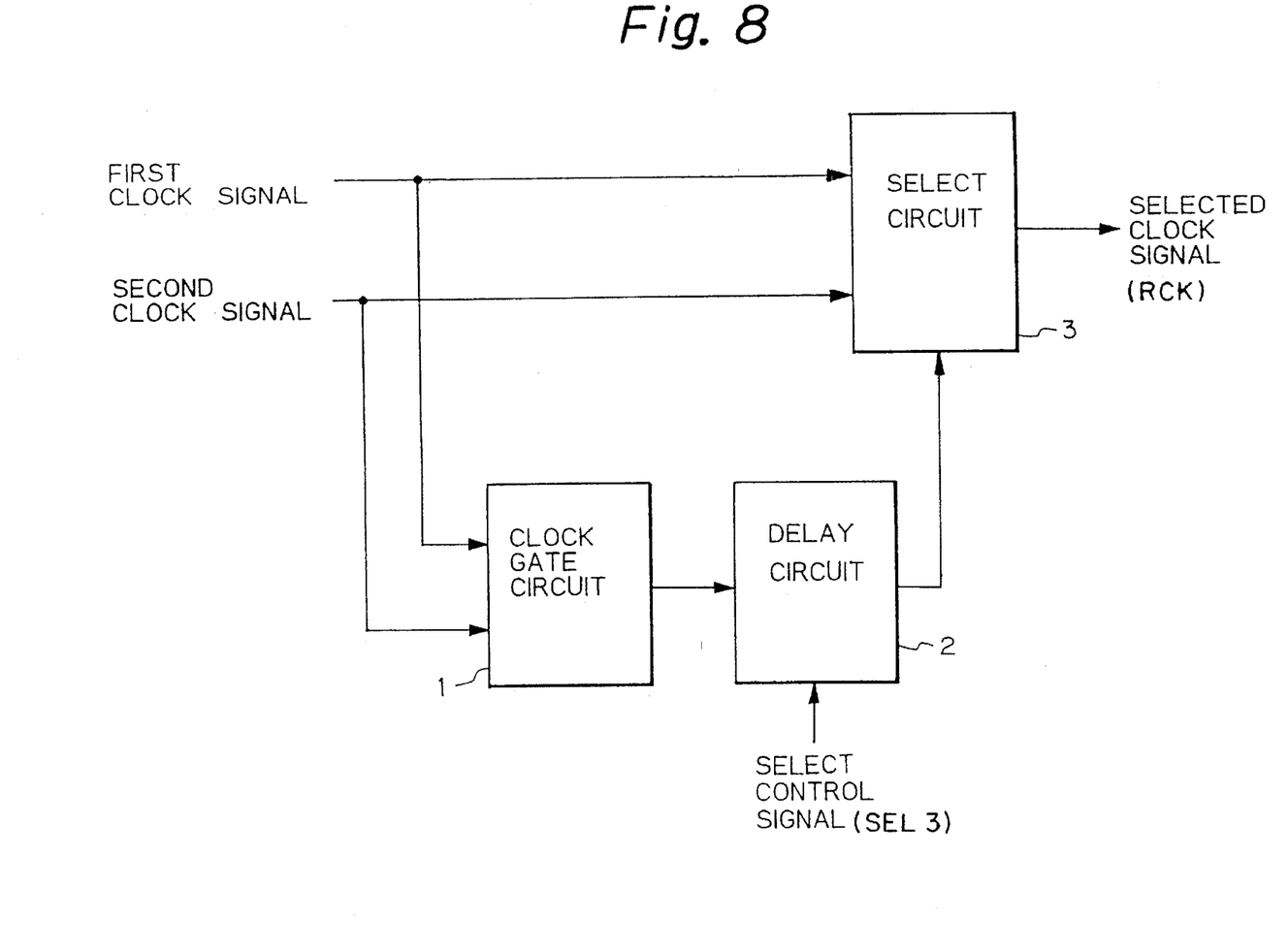
FIG. 8 is a diagram illustrating the basic construction of the present invention.

Basic Operations of Present Invention (FIG. 8)

FIG. 8 is a diagram illustrating the basic construction of a clock change circuit according to the present invention. The clock change circuit of FIG. 8 receives two clock signals the duty ratios of which are equal, the phase of the second clock is delayed by a phase difference not less than 0° and less than a duration in which each of the clock signals is at an active level in a cycle, and provision is given for preventing trouble in the use of the selected clock signal when changing from one to another of the two received clock signals. The selection of one of the two clock signals is performed according to a select control signal applied to the construction of FIG. 8.

In FIG. 8, reference numeral 1 denotes a clock gate circuit, 2 denotes a delay circuit, and 3 denotes a select circuit.

The clock gate circuit 1 detects when both the first and second clock signals are at an inactive level to output an active timing signal indicating the timing.

The delay circuit 2 inputs the above select control signal and the timing signal, and outputs a delayed select control signal the state of which is changed to the same state of the select control signal after the active timing signal is received from the clock gate circuit 1.

The select circuit 3 inputs the first and second clock signals, and selects one of the first and second clock signals according to the delayed select signal to output the selected signal.

According to the construction of FIG. 8, the change of the clock signal in the select circuit 3 is performed according to the output of the delay circuit 2, that is, the clock change is performed only when both the first and second clock signals are at the inactive level. Therefore, the phase of the clock signal selected after the clock change is delayed by a phase difference not less than 0° and less than a duration in which each clock signal is at an active level in one cycle, from the phase of the clock signal selected before the clock change. Thus, at the time of the clock change, the output of the clock change circuit according to the present invention is at the inactive level for a duration (as a minimum duration) near the duration in which each of the first and second clock signals is at the inactive level when the phase difference between the first and second clock signals is close to 0. Otherwise, at the time of the clock change, the output of the clock change circuit according to the present invention is at the inactive level for a duration (as a maximum duration) which is equal to a sum of one cycle and a duration in which each of the first and second clock signals is at the active level, when the phase difference between the first and second clock signals is close to the duration in which each of the first and second clock signals is at the inactive level. Thereafter, the output of the clock change circuit according to the present invention, rises at the same timings of the rising of the clock signal after the clock change, that is, the output of the clock change circuit becomes identical to the clock signal selected after the change.

Thus, a stable clock signal can be obtained as the output of the clock change circuit indicated in FIG. 8 without generating a spike in the output.

Since the construction of FIG. 8 contains only one select circuit 3 while the construction of FIG. 6 contains two selectors, the hardware size of the construction of FIG. 8 is reduced compared with the conventional construction of FIG. 6 even when taking account of the addition of the gate circuit 1 of FIG. 8.

Figure 9:
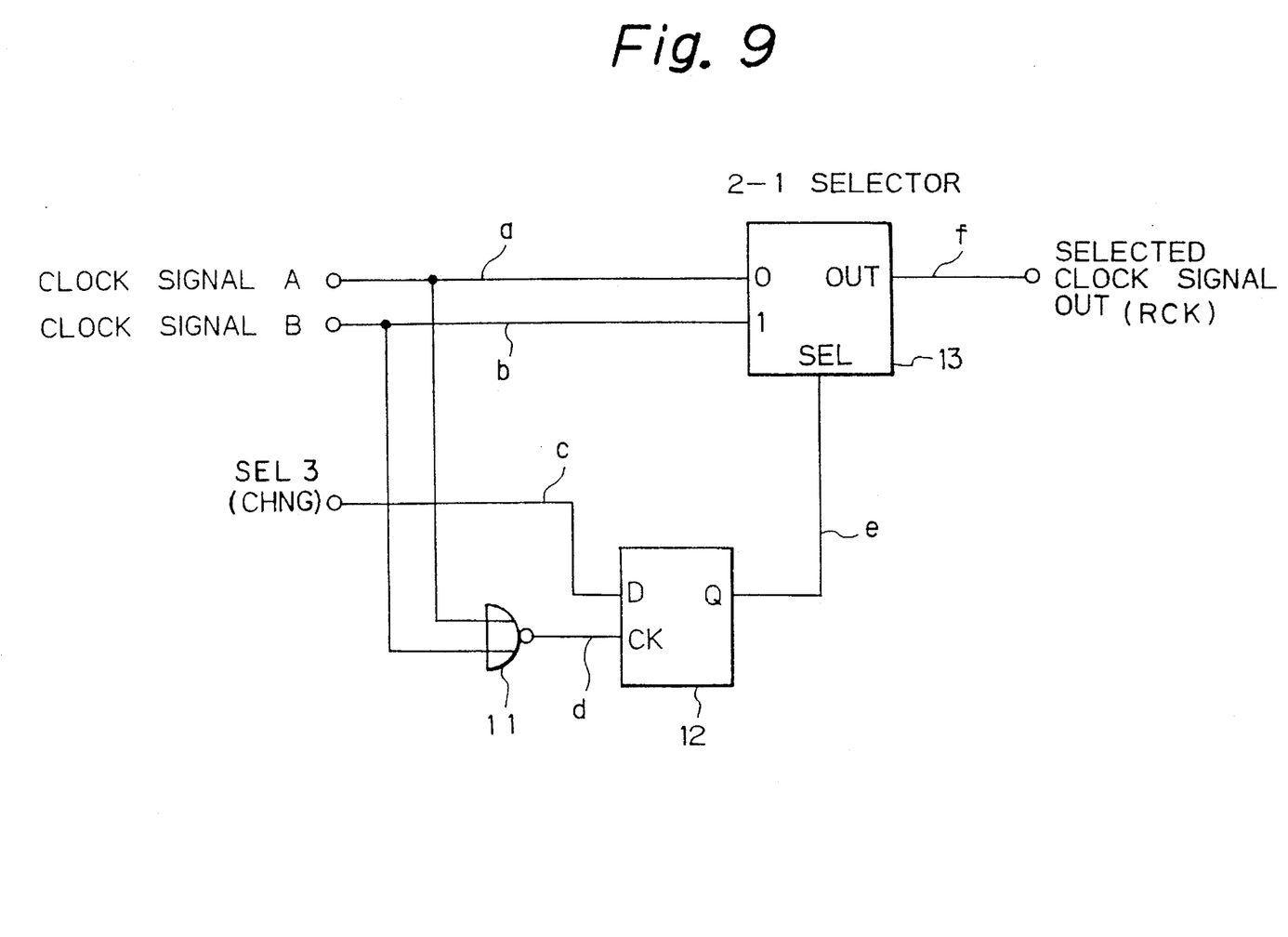
FIG. 9 is a diagram illustrating the construction of an embodiment of the present invention.
Figure 10A:
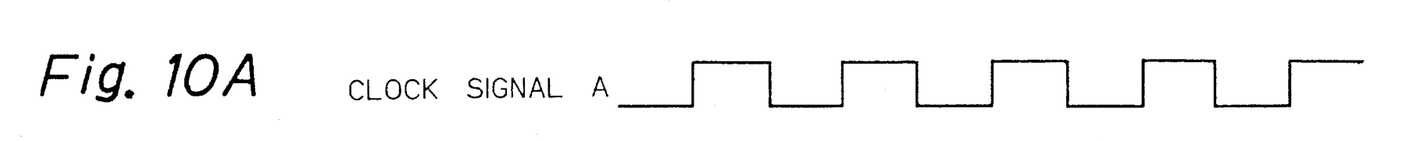
FIGS. 10A to 10F are timing diagrams of the operation of the construction of FIG. 9.
Figure 10B:
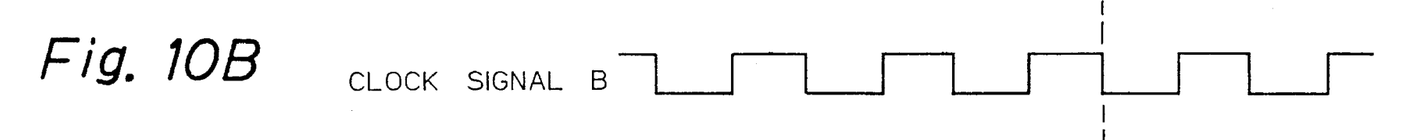
Figure 10C:
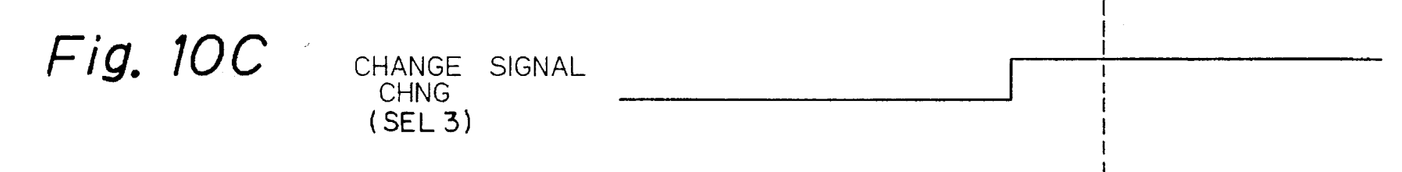
Figure 10D:
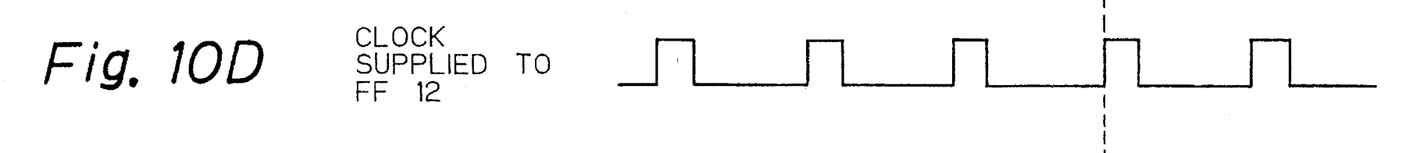
Figure 10E:
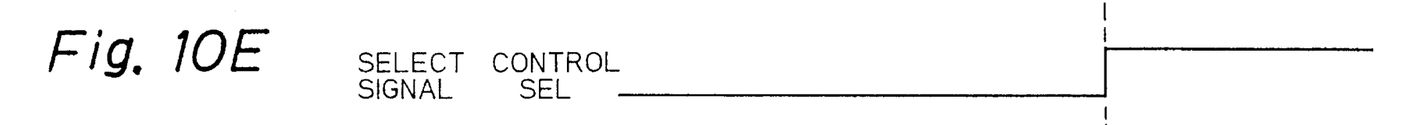
Figure 10F:
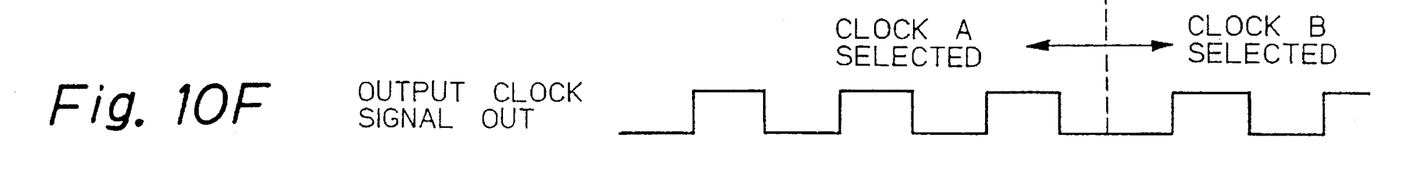

Embodiment of Present Invention (FIGS. 9, 10A and 10B)

FIG. 9 is a diagram illustrating a construction of an embodiment of the present invention. In FIG. 9, reference numeral 11 denotes an NOR gate, 12 denotes a D-type flip-flop circuit, and 13 denotes a 2–1 selector. The construction of FIG. 9 corresponds to the construction of FIG. 8. Two clock signals A (indicated by a) and B (indicated by b) having the same duty ratio, are applied to the two input terminals of the selector 13 and the two input terminals of the NOR gate 11, respectively. A select control signal CHNG (indicated by c), which is supplied to the construction of FIG. 9 to change the selection of the clock signal from one to the other of the clock signals A and B, is applied to the data input terminal D of the D-type flip-flop circuit 12. The output (indicated by d) of the NOR gate 11 is applied to the edge-triggered input terminal CK of the D-type flip-flop circuit 12. The non-inverted data output Q of the D-type flip-flop circuit 12 is applied to the selector 13 as a select control signal (indicated by e). The output (indicated by f) of the selector 13 is the output of the construction of FIG. 9.

FIGS. 10A to 10F are timing diagrams of an operation of the construction of FIG. 9. In this example, it is assumed that the duty ratios of the two clock signals A and B are equal to 50%. As indicated in FIG. 10, according to the construction of FIG. 9, the clock signal is changed in the selector 13 which is controlled by the output e of the D-type flip-flop circuit 12, when both the two clock signals A and B are at an inactive level, similar to the construction of FIG. 8. Therefore, the phase of the clock signal A selected after the clock change is delayed by a phase difference not less than 0° and less than a duration in which each clock signal is at an active level in one cycle, from the phase of the clock signal B selected before the clock change. Thus, at the time of the clock change, the output f of the clock change circuit of FIG. 9 is at the inactive level for a duration ( as a minimum duration ) near the duration in which each of the clock signals A and B is at the inactive level when the phase difference between the clock signals A and B is close to 0. The lower limit of the duration in which the output f of the clock change circuit of FIG. 9 is at the inactive level, is equal to 0.5 cycle when the duty ratio is equal to 50%. Otherwise, at the time of the clock change, the output f of the clock change circuit of FIG. 9 is at the inactive level for a duration (as a maximum duration) which is equal to a sum of one cycle and a duration in which each of the clock signals A and B is at the active level, when the phase difference between the clock signals A and B is close to the duration in which each of the clock signals A and B is at the inactive level. The upper limit of the duration in which the output f of the clock change circuit of FIG. 9 is at the inactive level, is equal to 1.5 cycle when the duty ratio is equal to 50%. Thereafter, the output f of the clock change circuit of FIG. 9, rises at the same timings of the rising of the clock signal B after the clock change, that is, the output f of the clock change circuit of FIG. 9 becomes identical to the clock signal B selected after the change.

Thus, a stable clock signal can be obtained as the output f of the clock change circuit indicated in FIG. 9 without generating a spike in the output.

Since the construction of FIG. 9 contains only one select circuit 3 while the construction of FIG. 6 contains two selectors, the hardware size of the construction of FIG. 9 is reduced compared with the conventional construction of FIG. 6 even when taking account of the addition of the NOR gate circuit 11 of FIG. 9.

Application to Network Termination Apparatus (FIGS. 11, 12A to 12J, and 13A to 13J)

Figure 11:
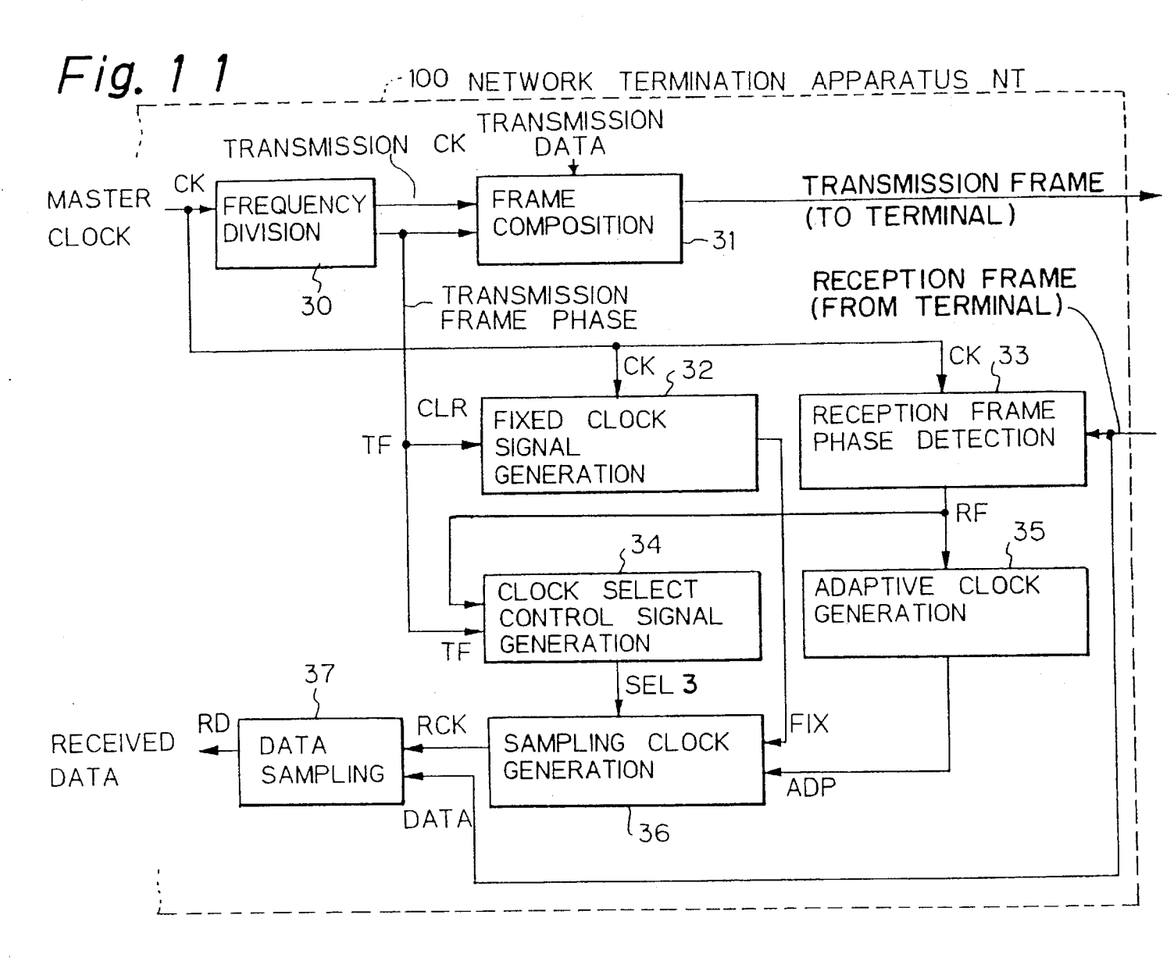
FIG. 11 is a diagram illustrating an example construction to which the present invention is applied.

FIG. 11 is a diagram illustrating an example construction to which the present invention is applied. FIG. 11 is a block diagram illustrating the construction relating to the generation of a receiving clock signal, in a digital service unit DSU (network termination apparatus) in accordance with the CCITT recommendation I.430, as an example application of the present invention. As indicated in FIGS. 1 to 3, one or plurality of terminals can be connected to the construction of FIG. 11 through a transmission line. In FIG. 11, reference numeral 30 denotes a frequency division circuit, 31 denotes a frame composition circuit, 32 denotes a fixed clock generation circuit, 33 denotes a received frame phase detect circuit, 34 denotes a clock change signal generation circuit, 35 denotes an adaptive clock generation circuit, 36 denotes a sampling clock generation circuit, 37 denotes a data sampling circuit, and 100 denotes a network termination apparatus (NT).

The frequency division circuit 30 inputs a master clock signal CK, for example, through a communication network in a higher level, and divides the frequency of the master clock signal CK to generate a transmission clock for synchronizing each bit of transmission data therewith, and a transmission frame synchronization clock for determining a frame phase of a transmission data frame. The frame composition circuit 31 inputs the above transmission clock, a transmission frame synchronization clock TF, and data to be transmitted from the network to the terminals connected to the network termination apparatus. The frame composition circuit 31 inserts the above data into a transmission frame having a predetermined format, and transmits the transmission frame to the terminals with a frame phase in synchronization with the above transmission frame synchronization clock, and a bit phase in synchronization with the above transmission clock. The fixed clock generation circuit 32 inputs the above master clock CK and the transmission frame synchronization clock TF, and divides the frequency of the master clock CK to generate the fixed receiving clock signal FIX having a predetermined phase difference.

When the above transmission frame is received by the terminal as indicated in FIGS. 1 to 3, timing information is extracted. Data in a transmission frame (which is a reception frame in the network termination apparatus (NT) 100) transmitted from each terminal to the network termination apparatus (NT) 100 of FIG. 11 is received by the network termination apparatus (NT) 100, with an approximately predetermined phase difference from the above transmission clock, where the difference corresponds to a distance from the network termination apparatus (NT) 100 to the terminal. The reception frame detect circuit 33 in the network termination apparatus (NT) 100 detects a timing of rising of a frame bit in the above reception frame. As explained before, generally, according to the CCITT recommendation I.430, the reception frame is a sum (superimposition) of two transmission frames simultaneously output from two terminals to the same bus. The reception frame detect circuit 33 detects the timing of rising of a frame bit in the reception frame which is transmitted from the one of the two terminals which is located nearer the network termination apparatus 100. The detected timing is supplied to the clock change signal generation circuit 34 and the adaptive clock generation circuit 35 as a reference clock RF.

The adaptive clock generation circuit 35 is a kind of PLL circuit, and monitors a phase difference between the above reference clock RF and an adaptive clock ADP which is output therefrom, and shifts a phase of the adaptive clock signal ADP when the phase difference deviates from a predetermined value, so that the phase difference becomes equal to the predetermined value. Namely, when the phase of the above reference clock RF is varied due to the change of the terminal which is located nearest the network termination apparatus 100 and which transmits data to the network termination apparatus 100, the adaptive clock generation circuit 35 shifts the phase of the above adaptive clock signal ADP in response to the varied phase of the reference clock RF to maintain the above phase difference equal to the above predetermined value. The sampling clock generation circuit 36 is a clock change circuit according to the present invention, and is constructed, for example, as indicated in FIG. 9. The sampling clock generation circuit 36 inputs the above fixed receiving clock FIX and the adaptive clock ADP as the aforementioned two clock signals, and inputs a clock change signal SEL 3 which is output from the clock change signal generation circuit 34, as the aforementioned select control signal. The clock change signal generation circuit 34 inputs the reference clock RF and the above transmission frame synchronization clock TF, determines a delay of the phase of the reference clock RF from the phase of the above transmission frame synchronization clock TF, and generates and supplies a clock change signal SEL 3 to the sampling clock generation circuit 36, so that the sampling clock generation circuit 36 selects the fixed receiving clock FIX when the determined delay is less than another predetermined value (that is, when the nearest terminal is connected at a very short distance from the network termination apparatus 100), and that the sampling clock generation circuit 36 selects the adaptive clock ADP when the determined delay is not less than the above other predetermined value. Thus, the aforementioned clock change operation in the network termination apparatus 100 can be realized. The sampling clock signal RCK output from the sampling clock generation circuit 36 is supplied to the data sampling circuit 37, together with data DATA in the reception frame, and the data sampling circuit 37 recognizes data of each bit in the reception frame at the timing of the above sampling clock signal RCK to output the recognized bits as received data RD.

FIGS. 12A to 12J are timing diagrams of an operation of the construction of FIG. 11. FIGS. 12A to 12J shows variations of signals in the construction of FIG. 11 in the case wherein two terminals connected to the network termination apparatus 100 through a transmission line, transmit signals to the network termination apparatus 100 through the transmission line, and the delay of the phase of the above reference clock RF from the phase of the above transmission frame synchronization clock TF is less than the above predetermined value; and then one of the two terminals, located nearer the network termination apparatus 100, stops the transmission of the signal.

Figure 12A:
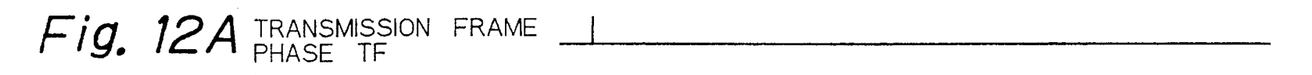
FIGS. 12A to 12J are timing diagrams of the operation of the construction of FIG. 11.
Figure 12B:
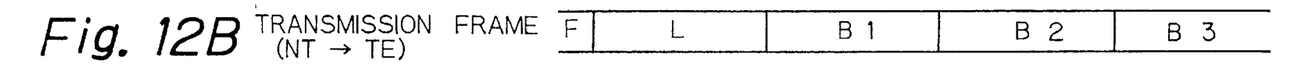
Figures 12C, 12D:
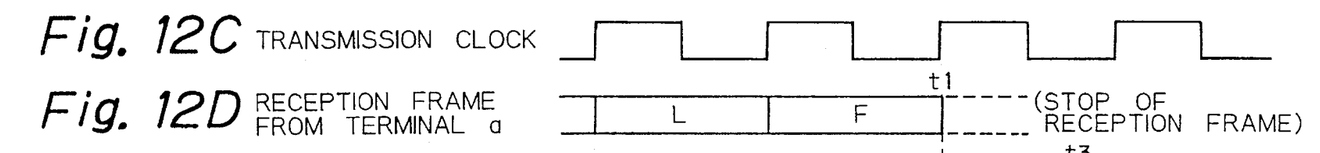
Figure 12E:
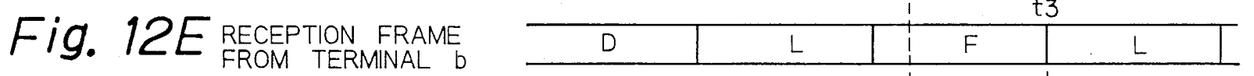
Figure 12F:
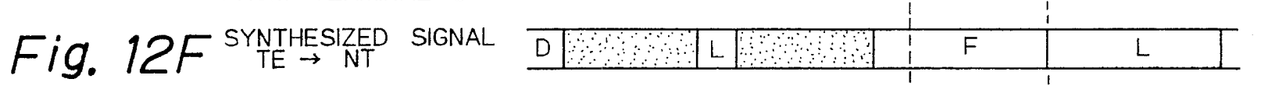
Figure 12G:
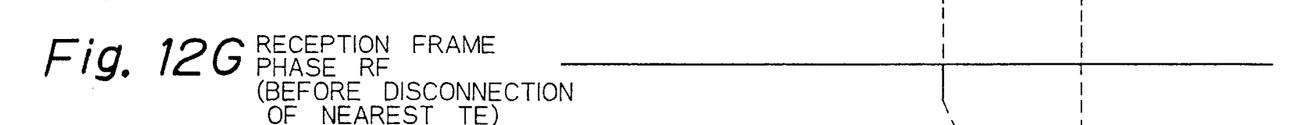
Figures 12H, 12I:
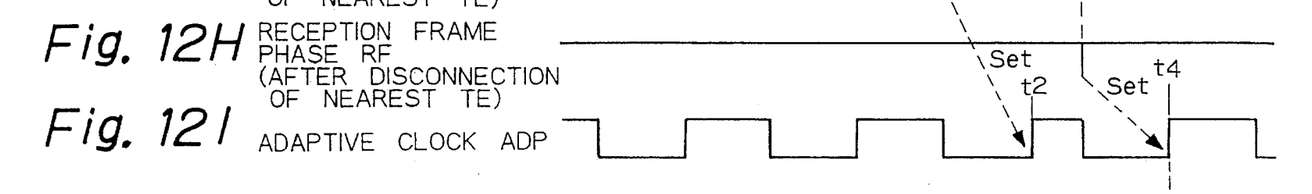
Figure 12J:
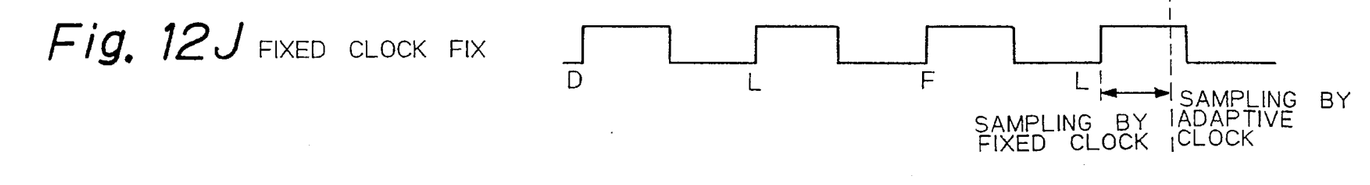

In FIGS. 12A to 12J: F denotes a frame bit (for example, has a value corresponding to a high level); L denotes a balance bit which has a value equal to an inversion of the frame bit F; and D, B1, B2, and B3 each denote a data bit. Until the time t1 in FIGS. 12A to 12J, both terminals a and b connected to the network termination apparatus 100 through the transmission line, transmit signals to the network termination apparatus 100, and the delay of the phase of the above reference clock RF from the phase of the above transmission frame synchronization clock TF is less than the above predetermined value. At the time t1, the terminal a, located nearer the network termination apparatus 100, stops the transmission of the signal (FIG. 12D). Since the terminal b becomes only one terminal transmitting a signal to the network termination apparatus 100 due to the stop of the transmission by the terminal a, the terminal b becomes the terminal nearest the network termination apparatus 100. Then, the reception frame phase detect circuit 33 detects the time t3 of fall of the frame bit F of the reception frame (FIG. 12E), and generates a reference clock RF (FIG. 12H) in response to the detection. Responding to the reference clock RF, the phase of the adaptive clock ADP output from the adaptive clock generation circuit 35, is shifted so as to rise, for example, at the time t4, as indicated in FIG. 12I. The phase shift in the above reference clock RF is detected by the clock change signal generation circuit 34. The clock change signal generation circuit 34 determines that the delay of the shifted phase of the reference clock RF from the transmission frame synchronization clock TF is not less than the above predetermined value, and changes the state of the above clock change signal SEL, from the state of "selection of fixed clock" to the state of "selection of adaptive clock". Due to the phase shift of the adaptive clock ADP in response to the phase shift of the above reference clock RF, the phase difference between the phase of the adaptive clock ADP which is selected after the clock change, and the phase of the fixed clock FIX which is selected before the clock change, satisfies the aforementioned condition that the duty ratios of the clock signals selected before and after the clock change are equal, and the phase of the clock after the clock change is delayed by a phase difference not less than 0° and less than a duration in which each of the clock signals before and after the clock change is at an active level in a cycle. It is assumed that the phase of the fixed clock FIX and the phase difference between the adaptive clock and the reference clock RF, are determined in advance so that the data in the reception frame can be sampled satisfying the above condition. Therefore, due to the sampling clock generation circuit 36 according to the present invention, the clock change from the fixed clock FIX to the adaptive clock ADP in response to the stop of transmission from the nearer terminal, can be performed without causing trouble in sampling of the data from the other terminal synchronized with the clock signal subject to the clock change.

FIGS. 13A to 13J are timing diagrams of an operation of construction of FIG. 11. FIGS. 13A to 13J shows variations of signals in the construction of FIG. 11 in the case wherein a terminal b connected to the network termination apparatus 100 through a transmission line, transmits data in a first transmission frame to the network termination apparatus 100 through the transmission line, then the other terminal a, located nearer the network termination apparatus 100 than the terminal b, begins to transmit data in a second transmission frame to the network termination apparatus 100, the network termination apparatus 100 begins to receive the data in the second transmission frame (reception frame in the network termination apparatus 100) transmitted from the terminal a, and the delay of the phase of the above reference clock RF in response to the second transmission frame., from the phase of the above transmission frame synchronization clock TF is less than the above predetermined value.

Figure 13A:
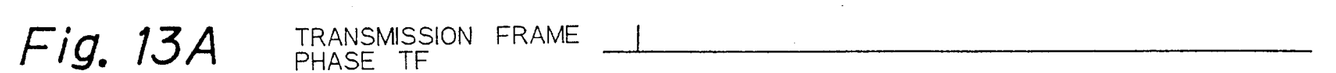
FIGS. 13A to 13J are timing diagrams of another operation of the construction of FIG. 11.
Figure 13B:
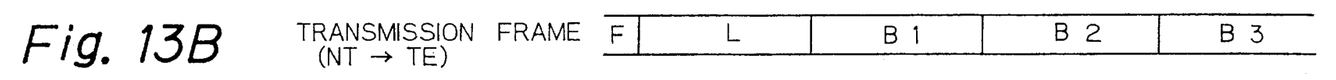
Figures 13C, 13D:
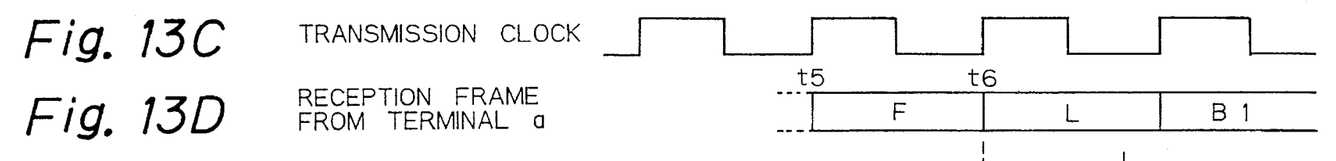
Figure 13E:
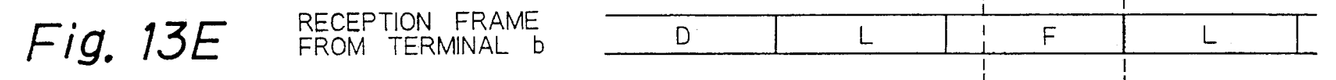
Figure 13F:
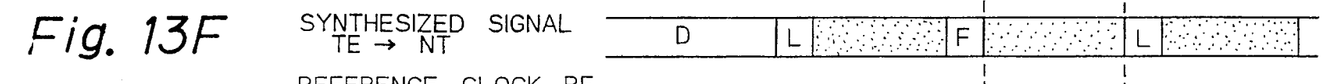
Figure 13G:
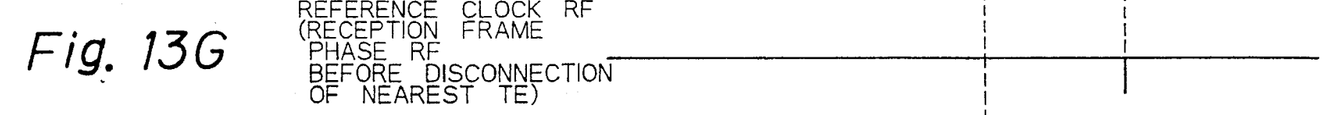
Figures 13H, 13I:
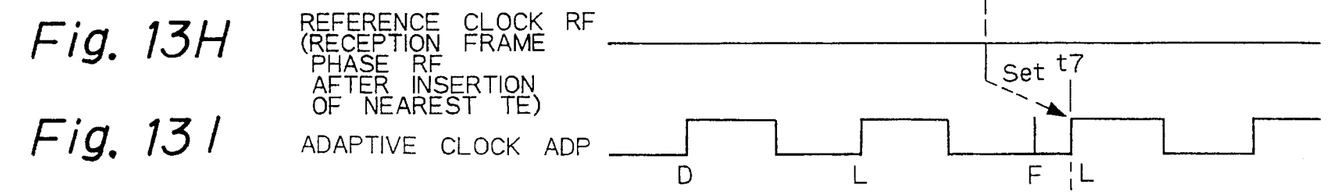
Figure 13J:
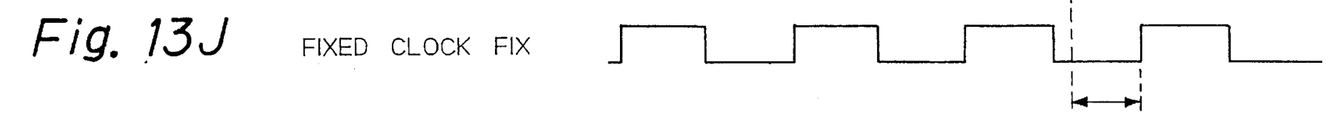

Until the time t5, only the terminal b transmits data in the first transmission frame to the network termination apparatus 100, and the phase of a first reception frame (corresponding to the first transmission frame) received from the terminal b, is such that the delay of the phase of the reference clock RF in response to the first reception frame from the terminal b, from the phase of the above transmission frame synchronization clock TF, is not less than the above predetermined value. Therefore, the adaptive clock ADP is output from the sampling clock generation circuit 36, as the sampling clock. In this situation, at the time t5, the other terminal a, located nearer the network termination apparatus 100 than the terminal b, begins to transmit data in the second transmission frame to the network termination apparatus 100, and the network termination apparatus 100 begins to receive the data in the second transmission frame (a second reception frame in the network termination apparatus 100) transmitted from the terminal a. Then, the reception frame phase detect circuit 33 detects the time t6 of fall of the frame bit F of the second reception frame (FIG. 13G), and generates a reference clock RF (FIG. 13H) in response to the detection. Responding to the reference clock RF, the phase of the adaptive clock ADP output from the adaptive clock generation circuit 35, is shifted so as to rise, for example, at the time t7, as indicated in FIG. 13I. The phase shift in the above reference clock RF is detected by the clock change signal generation circuit 34. The clock change signal generation circuit 34 determines that the delay of the shifted phase of the reference clock RF from the transmission frame synchronization clock TF is less than the above predetermined value, and changes the state of the above clock change signal SEL, from the state of "selection of adaptive clock" to the state of "selection of fixed clock". Due to the phase shift of the adaptive clock ADP in response to the phase shift of the above reference clock RF, the phase difference between the phase of the adaptive clock ADP which is selected before the clock change, and the phase of the fixed clock signal FIX which is selected after the clock change, satisfies the aforementioned condition that the duty ratios of the clock signals selected before and after the clock change are equal, and the phase of the clock after the clock change is delayed by a phase difference not less than 0° and less than a duration in which each of the clock signals before and after the clock change is at an active level in a cycle. It is assumed that the phase of the fixed clock FIX and the phase difference between the adaptive clock and the reference clock RF, are determined in advance so that the data in the reception frame can be sampled satisfying the above condition. Therefore, due to the sampling clock generation circuit 36 according to the present invention, the clock change from the adaptive clock ADP to the fixed clock FIX in response to the start of transmission from the nearer terminal, can be performed without causing trouble in sampling of the data from the other terminal synchronized with the clock signal subject to the clock change.

Figure 14:
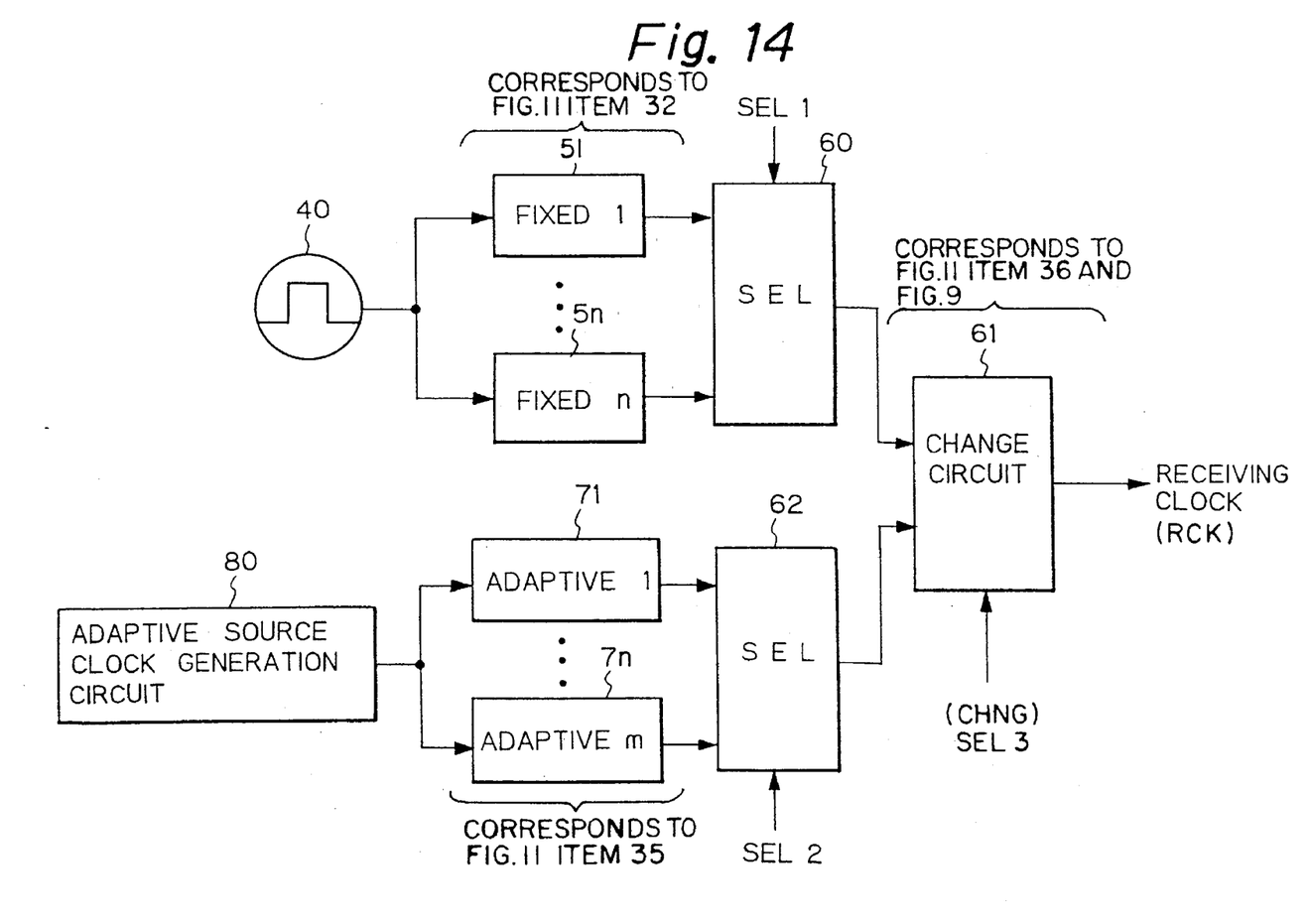
FIG. 14 is a diagram illustrating another example construction to which the present invention is applied.

Another Application (FIG. 14)

FIG. 14 is a diagram illustrating another example construction to which the present invention is applied. In FIG. 14, reference numeral 40 denotes a fixed receiving clock source signal generation circuit for generating a source signal of the fixed receiving clock, 51 to 5n denote delay circuits for generating a plurality of fixed receiving clock candidate signals respectively having different phases by adding different delays to the above source signal of the fixed receiving clock, 60 denotes a selector for selecting one of the above plurality of fixed receiving clock candidate signals as the fixed receiving clock signal, 80 denotes an adaptive clock source signal generation circuit for generating a adaptive clock source signal having a predetermined phase difference from the phase of the frame bit in the reception frame such as the adaptive clock generation circuit 35 of FIG. 11, 71 to 7m denote delay circuits for generating a plurality of adaptive clock candidate signals respectively having different phases by adding different delays to the above adaptive clock source signal, 62 denotes a selector for selecting one of the plurality of adaptive clock candidate signals as the adaptive clock signal, and 61 denotes a clock change circuit according to the present invention, for example, having the construction of FIG. 9. The clock change circuit 61 corresponds to the sampling clock generation circuit 36 in the construction of FIG. 11. The construction of FIG. 14 may be applied to a network termination apparatus such as the network termination apparatus of FIG. 11. In this case, an error rate in the output (received data RD) of the data sampling circuit 37 in FIG. 11, may be monitored, and the selections of the fixed receiving clock FIX and the adaptive clock ADP in the selectors 60 and 62 are made so that the error rate is minimized.

We claim:

1. A clock change circuit comprising:

clock gate means for receiving first and second clock signals, and outputting an active timing signal when both said first and second clock signals are at an inactive level, said active timing signal indicating the timing;

delay means being input a select control signal and the active timing signal, and for outputting a delayed select control signal the state of which is changed to the same state as the select control signal after the active timing signal is received from the clock gate means;

select means being input the first and second clock signals, and for selecting one of the first and second clock signals according to the delayed select control signal to output the selected clock signal;

fixed receiving clock generation means for generating a fixed receiving clock signal having a predetermined frequency and a predetermined phase;

original receiving clock detect means for being input a data signal, and detecting timing information included in the data signal to generate an original receiving clock signal in synchronization with the data signal, based on the timing information;

adaptive clock generation means for inputting the original receiving clock signal, outputting an adaptive clock signal, detecting a phase difference between the adaptive clock signal and the original receiving clock signal, and shifting the, phase of the adaptive clock signal so that the phase difference becomes equal to a predetermined value; and clock change signal generation means for determining whether or not the phase of the original receiving clock signal is within a predetermined range from the phase of a transmission frame synchronization clock, and outputting as the select control signal a signal the state of which varies dependent upon whether or not the phase of the original receiving clock signal is within the predetermined range from the phase of the transmission frame synchronization clock.

2. A clock change circuit according to claim 1, wherein the clock gate means is an NOR gate for inputting the first and second clock signals at two input terminals thereof, the delay means is a D-type flip-flop circuit for inputting the select control signal at a data input terminal thereof, and an output of the NOR gate at an edge-triggered input terminal thereof, and outputting the delay select control signal from a data output terminal thereof, and the selector means is a 2–1 selector.

3. A clock change circuit according to claim 1, wherein the fixed receiving clock generation means comprises, a plurality of fixed receiving clock candidate signal generation means for generating a plurality of fixed receiving clock candidate signals respectively having different phases, and select means for selecting one of the plurality of fixed receiving clock candidate signals, as the fixed receiving clock signal.

4. A clock change circuit according to claim 1, wherein the adaptive clock generation means comprises, a plurality of adaptive clock candidate signal generation means for generating a plurality of adaptive clock candidate signals respectively having different phases, and select means for selecting one of the plurality of adaptive clock candidate signals, as the adaptive clock signal.

* * * * *